(12) United States Patent
Therrien et al.

(10) Patent No.: US 12,155,728 B2
(45) Date of Patent: Nov. 26, 2024

(54) SYSTEM FOR CONNECTING CLOUD-BASED EMERGENCY CALL SYSTEMS WITH PRIVATE EMERGENCY SERVICES NETWORKS

(71) Applicant: MOTOROLA SOLUTIONS, INC., Chicago, IL (US)

(72) Inventors: Nicolas Therrien, Gatineau (CA); Olivier St-Amour, Gatineau (CA); Julien Bastien-Beaudet, Ottawa (CA); Michel-Olivier Bouchard, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 42 days.

(21) Appl. No.: 17/823,735

(22) Filed: Aug. 31, 2022

(65) Prior Publication Data

US 2024/0073285 A1    Feb. 29, 2024

(51) Int. Cl.
| | | |
|---|---|---|
| G06F 15/16 | (2006.01) | |
| G06F 11/30 | (2006.01) | |
| H04L 65/65 | (2022.01) | |
| H04L 67/02 | (2022.01) | |
| H04L 67/12 | (2022.01) | |
| H04L 67/141 | (2022.01) | |
| H04L 9/40 | (2022.01) | |
| H04L 69/329 | (2022.01) | |

(52) U.S. Cl.
CPC ........ *H04L 67/141* (2013.01); *G06F 11/3055* (2013.01); *H04L 65/65* (2022.05); *H04L 67/02* (2013.01); *H04L 67/12* (2013.01); *H04L 63/0209* (2013.01); *H04L 69/329* (2013.01)

(58) Field of Classification Search
CPC ....... H04L 67/141; H04L 65/65; H04L 67/02; H04L 67/12; H04L 63/0209; G06F 11/3055
See application file for complete search history.

(56) References Cited

U.S. PATENT DOCUMENTS

| | | |
|---|---|---|
| 8,799,478 B2 | 8/2014 | Chou et al. |
| 2006/0193323 A1 | 8/2006 | Lee |
| 2014/0108665 A1* | 4/2014 | Arora ................... H04L 67/563 709/227 |
| 2018/0183879 A1 | 6/2018 | Chandwani et al. |
| 2020/0304638 A1* | 9/2020 | Jensen ................. H04M 3/5116 |

* cited by examiner

*Primary Examiner* — Normin Abedin

(57) ABSTRACT

Systems, devices, and methods described herein provide protocol endpoints that execute locally within private networks and perform a set of transport-related operations specified an application-layer protocol to which messages exchanged between local applications executing within private networks and cloud applications executing in cloud computing systems conform. However, systems, devices, and methods described herein also leverage computing resources of the cloud by having the cloud applications (rather than the protocol endpoints) perform a second set of operations specified by the application-layer protocol. By functioning in this manner, systems, devices, and methods described herein facilitate real-time bidirectional communication flow between local applications executing within private networks and cloud applications without exposing the private networks to the public Internet and without using a VPN (thereby avoiding the problematic overhead of a VPN) with respect to real-time communications.

20 Claims, 10 Drawing Sheets

SYSTEM FOR CONNECTING CLOUD-BASED EMERGENCY CALL SYSTEMS WITH PRIVATE EMERGENCY SERVICES NETWORKS

BACKGROUND

Emergency calls (e.g., 9-1-1 calls) may be routed to specialized call centers known as public safety answering points (PSAPs). Call takers answer the emergency calls, assess the nature of the emergencies being reported by those calls, and dispatch appropriate emergency-response personnel (e.g., police, firefighters, and paramedics) accordingly. It is projected that cloud-based solutions for handling and routing emergency calls will soon begin to be used in the industry. Such cloud-based solutions will be faced with the challenge of connecting to on-premise Emergency Communications Centers (ECCs) in a reliable manner. Some examples of hardware that is often included on-premise in ECCs include dispatch systems (e.g., dispatch servers or dispatch consoles that are dedicated hardware units), computing devices of various types (e.g., servers, door controllers, camera-control systems, status-light controllers, workstations, desktop computers, laptop computers, network routers, network switches, and network storage devices), status light poles, a private branch exchange (PBX), recorders, and other hardware that facilitates operations performed by ECCs.

The Request for Comment (RFC) 1123 document provided by the Internet Engineering Task Force (IETF) sets forth the IETF definition for the application layer in the Internet Protocol Suite. A few examples of application-layer protocols include Hypertext Transfer Protocol (HTTP), Real-Time Protocol (RTP), Domain Name Services (DNS), Messaging Service Related Protocol (MSRP), and Session Initiation Protocol (SIP) (which is defined in the Request for Comment (RFC) 3261-SIP document provided by the IETF).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various examples of concepts that include the claimed invention, and to explain various principles and advantages of those examples.

Figure 1A:
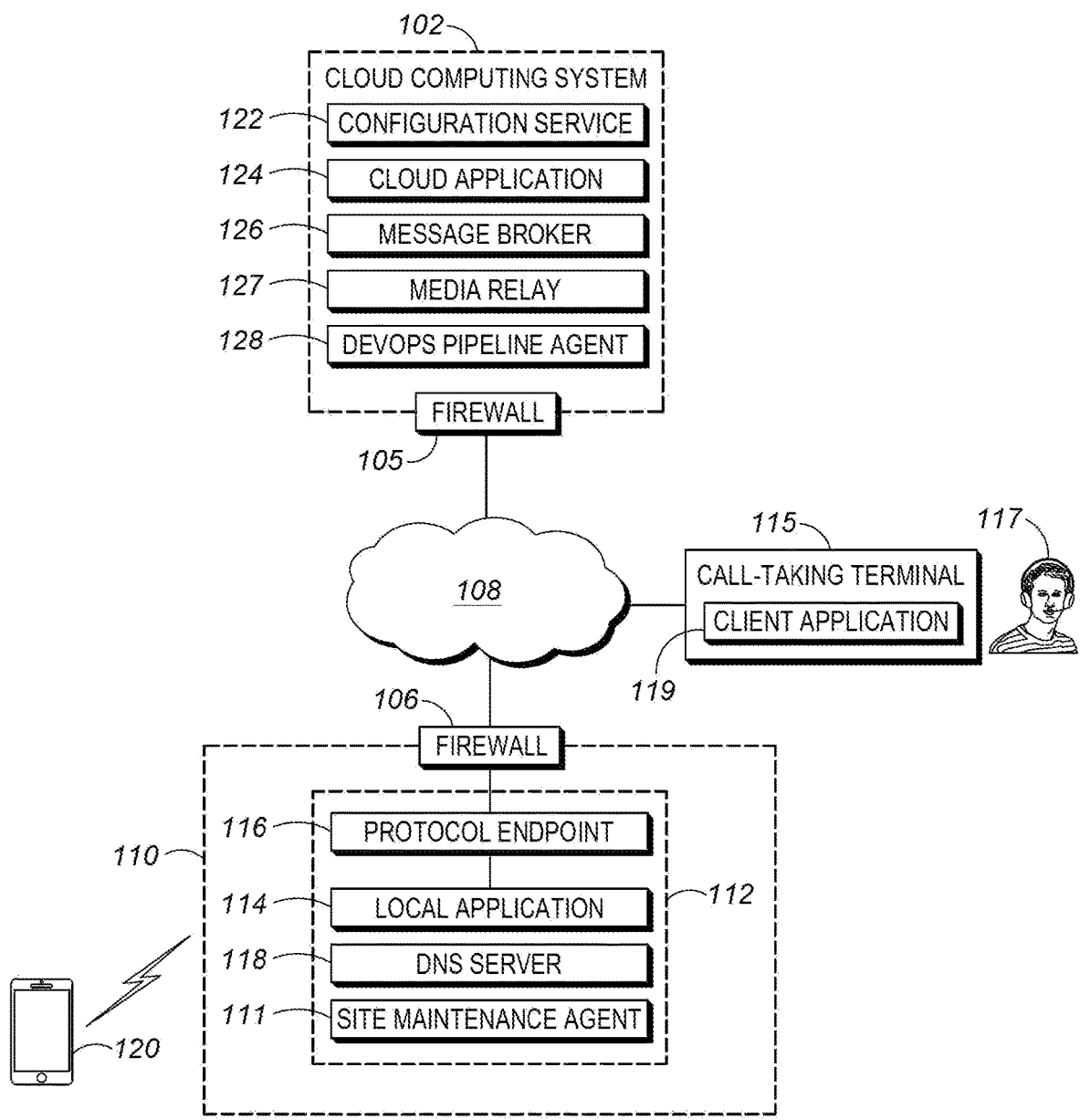
FIG. 1A illustrates a network environment in which systems described herein may operate, according to one example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION OF THE INVENTION

Emergency calls (e.g., 9-1-1 calls) may be routed to specialized call centers known as public safety answering points (PSAPs). Call takers answer the emergency calls, assess the nature of the emergencies being reported by those calls, and dispatch appropriate emergency-response personnel (e.g., police, firefighters, and paramedics) accordingly. It is projected that cloud-based solutions for handling and routing emergency calls will soon begin to be used in the industry. Such cloud-based solutions have the potential to leverage the vast computing resources available in the cloud to provide increased efficiency, streamlined workflows, increased scalability, and other advantages (e.g., the capacity for dispatchers and other call takers to work from home seamlessly). Cloud-based technologies have the potential to enhance the capacity, resilience, and upgradability of systems for handling emergency calls.

There are, however, some obstacles that can complicate the adoption of cloud-based call systems for handling emergency calls. While issues like latency and connectivity problems in real-time communications may be a mere inconvenience in some contexts, reducing latency and connectivity problems is critically important in the context of emergency calls, where time is of the essence. Many jurisdictions therefore have policies mandating that latency levels and reliability levels in systems that handle emergency calls meet certain criteria. To ensure that these criteria are met, many entities that are tasked with handling emergency calls (e.g., governmental communication agencies, police departments, and fire departments) use Emergency Services Internet Protocol (IP) Networks (ESInets) that conform to the National Emergency Number Association (NENA) standard as part of a Next Generation 911 (NG911) system architecture (e.g., i3). ESInets serve as reliable networks that can support and transport calls to PSAPs.

However, most cloud-based solutions for handling emergency calls use the public Internet to transmit media streams between devices used by callers (e.g., mobile phones) and devices used by call takers (e.g., a call-taking terminal comprising a computer equipped with headphones and a microphone). For security reasons and to ensure compliance with the laws of any applicable jurisdictions, exposing an ESInet to the public Internet is not an option. Since protocols like SIP that are used for emergency communications are stateful and support bidirectional digital communications, entities that use ESInets are obliged to seek out a solution that allows digital communications between call-taking terminals that reside within an ESInet and mobile devices that reside outside of the ESInet without compromising the security of the ESInet.

One approach is to use virtual private networks (VPNs) to create private communication bridges between ESInets and the Cloud. However, the use of VPNs can exacerbate latency problems. When used in the context of Emergency Call Handling Systems, VPNs create bottlenecks, cause call-affinity issues, and interfere with real-time transmissions (e.g., by causing network issues such as packet retransmission, packet reordering, and latency that can make caller voices sound choppy or robotic) during periods of peak call volume. Given that time and communication quality are of the essence in the context of emergency calls, the problems caused by VPNs could lead to serious consequences when emergency call volume is higher than normal. Communication during emergency situations is often difficult enough without the additional complications that the use of VPNs in this context can introduce.

Thus, there exists a demand for technical methods, devices, and systems that can allow real-time bidirectional digital communications to flow securely, concurrently, and independently between local applications executing within private networks (e.g., ESInets) and cloud applications executing in cloud computing systems without using a VPN or exposing the private networks to the public Internet. Systems, devices, and methods described herein provide protocol endpoints that execute locally within private networks and perform a set of transport-related operations specified by an application-layer protocol to which messages exchanged between local applications executing within private networks and cloud applications executing in cloud computing systems. The systems, devices, and methods described herein also leverage computing resources of the cloud by having the cloud applications (rather than the protocol endpoints) perform a second set of operations (e.g., non-transport-related operations) specified by the application-layer protocol. If the application-layer protocol is SIP, for example, operations that are encompassed by a dialog layer or a transaction layer may be performed by cloud applications. By functioning in this manner, the systems, devices, and methods described herein facilitate real-time bidirectional communication flow between local applications executing within private networks and cloud applications executing in cloud computing systems without exposing the private networks to the public Internet and without using a VPN (thereby avoiding the problematic overhead that a VPN would cause).

Further advantages and features consistent with this disclosure will be set forth in the following detailed description with reference to the figures.

FIG. 1A illustrates a network environment 100 in which systems described herein may operate, according to one example. As shown, the network environment 100 includes a cloud computing system 102. As will be recognized by persons of skill in the art, the cloud computing system 102 comprises a plurality of servers equipped with processors, memory, storage, and network interface cards (e.g., network server cards) through which the servers in the cloud computing system 102 can communicate with each other within the cloud computing system 102. The cloud computing system 102 may be configured to operate a digital or Internet Protocol (IP)-based 911 system in accordance with one or more industry standards (e.g., National Emergency Number Association (NENA i3) Next Generation 9-1-1). Persons of skill in the art will understand that any functionality attributed to the cloud computing system 102 may be executed using computing resources such as processors, memory, network interconnects, and storage that are distributed across multiple sites (e.g., in a cloud computing platform) and are interconnected via the network 108 (for example, a wide-area-network, which may also comprise multiple smaller networks). In one example, the cloud computing system 102 may include a message broker 126 (e.g., a Kafka cluster, a RabbitMQ cluster, or a computer cluster of another type).

In addition, the cloud computing system 102 can communicate with the firewall 106 via the firewall 105 and the network 108. The network 108 may comprise a wide area network (WAN) such as the Internet. The firewall 105 and the firewall 106 may be dedicated devices (e.g., appliances) or software modules that execute on devices such as network routers or network switches. The firewall 105 may be configured to prevent unauthorized access to the cloud computing system 102.

The firewall 106 may be configured to prevent unauthorized access to the private network 110. The private network 110 may comprise an Emergency Services Internet Protocol (IP) network (ESInet), a private branch exchange (PBX) telephone network, a local area network (LAN), an enterprise network, an Integrated Services Digital Network (ISDN) (e.g., which can transfer voice, video, and data over a digital connection), some other type of digital or analog communication network, or a combination thereof. The private network 110 may be a private network for an Emergency Communications Center (ECC) (e.g., A Public Safety Answering Point (PSAP)). The ECC may be operated by an entity that is tasked with handling emergency calls, such as a governmental communication agency, a police department, or a fire department.

The on-premise systems 112 may comprise various types of hardware that are connected to the private network 110. For example, the on-premise systems 112 may include computer-aided dispatch systems (e.g., dispatch servers or dispatch consoles that are dedicated hardware units), computing devices of various types (e.g., servers, door controllers, camera-control systems, status-light controllers, workstations, desktop computers, laptop computers, network routers, network switches, and network storage devices), status light poles, a private branch exchange (PBX), recorders, and other hardware that facilitates operations performed by an ECC.

The local application 114 represents software that executes on hardware (e.g., processors and memory) within the on-premise systems 112 of the private network 110. While the local application 114 is shown as a single block, persons of skill in the art will understand that there may be multiple instances of multiple applications executing concurrently on hardware within the on-premise systems 112 at any given time. For example, if the local application 114 represents software that is executed on a telecommunications device (e.g., a workstation, a laptop, a mobile tablet, or a desktop computer that is equipped with peripherals such as a headset with a microphone, a keyboard, a mouse, an electronic display, and a digital camera) for routing or handling emergency calls, multiple instances of the local application 114 may be executing concurrently on multiple telecommunication devices within the on-premise systems 112. If the local application 114 is software that is used for handling calls, the local application 114 may allow communication through a media stream (e.g., of audio data, video data, or a combination thereof) and, in some examples, instant messaging or simple messaging service (SMS) text messaging.

The cloud application 124 (also referred to herein as a "cloud-based application") represents software that executes in the cloud computing system 102 and is configured to exchange communications with the local application 114 to perform functions within the cloud computing system 102 such as call routing, call handling, or other types of functions related to emergency communications. For example, if the local application 114 is software for routing emergency calls, the cloud application 124 may be designed to allow an emergency call that originates from the caller device 120 and is received (e.g., via an Originating Service Provider (OSP)), routed, or otherwise processed by the local application 114 at the on-premise systems 112 to be connected to the call-taking terminal 115 (which is a telecommunications device that is not located within the on-premise systems 112, but is connected to the cloud computing system 102 via the network 108). The call taker 117 (e.g., a dispatcher) may respond to the call via the call-taking terminal 115. The caller device 120 may be, for example, a cellular phone (e.g., a smart phone), a satellite phone, a Voice over Internet Protocol (VoIP) phone, a landline telephone, or even one of the types of telecommunication devices listed above.

The cloud application 124, however, does not have direct access to the local application 114 because the private network 110 is kept secure by the firewall 106. A VPN could be used to create a secure communication bridge between the cloud computing system 102 and the private network 110, but a VPN would introduce the problems discussed above with respect to VPNs. For example, using a VPN in this context would create a bottleneck that would increase latency when large numbers of emergency calls are handled by the cloud computing system 102 in parallel—especially if the cloud computing system 102 supports multiple ECCs that have multiple respective private networks and are spread across large geographical areas. Time is of the essence when emergency calls are being handled; latency, call affinity issues, and other technical problems that a VPN would cause or exacerbate could reduce the ability to effectively handle the emergency calls.

The protocol endpoint 116 provides a solution that avoids the disadvantages of a VPN without compromising the security of the private network 110, thereby allowing bidirectional communications to flow efficiently enough between the cloud application 124 and the local application 114 to support real-time emergency call handling through the cloud computing system 102 even when the volume of emergency calls being received is high.

The protocol endpoint 116 comprises software that executes within the on-premise systems 112 (e.g., on server or another device comprising a processor, memory, and a network interface card). The protocol endpoint 116 performs transport-related operations (e.g., message framing) specified by a transport layer of an application-layer protocol to which communications from the cloud application 124 and the local application 114 conform, but does not perform operations specified by other layers of the application-layer protocol (e.g., if the application-layer protocol is SIP, the protocol endpoint does not perform operations specified by a transaction layer and a dialog layer). (Note that, in addition to the transport-related tasks, the protocol endpoint 116 may optionally be configured to use transcoding to convert media to a different codec to ensure that bandwidth is used efficiently.) In other words, the protocol endpoint 116 implements a first part of the application-layer protocol that specifies transport-related operations such as message framing, connection management and reuse, port binding, transmitting and receiving, target resolution (e.g., DNS resolution), transport layer security (e.g., encryption) and network socket management. The first part of the application-layer protocol does not, however, specify operations that are not related to transporting messages. For example, the protocol endpoint 116 does not contain or apply any domain logic (i.e., functions that specify how data is created, stored, or changed) associated with the application-layer protocol. The majority of the processing power used by the protocol endpoint is therefore focused on message transport rather than on message interpretation or execution of actions requested by messages, so the protocol endpoint 116 allows messages to flow rapidly between the local application 114 and the cloud application 124 even during times of high call volume. Furthermore, since the protocol endpoint 116 exposes an interface for the application-layer protocol to the local application 114 via a client-sided connection, the inbound configuration of the firewall 106 does not have to be changed and the security of the private network 110 is not compromised. The domain logic (e.g., the operations specified by other layers of the application-layer protocol, such as the transaction layer and the dialog layer if the application-layer protocol is SIP) is executed by the cloud application 124 in the cloud computing system 102. In other words, the cloud application 124 is configured to implement a second part of the application-layer protocol that specifies domain logic and transactional operations but does not specify operations related to transporting messages. Execution of the domain logic in the cloud computing system 102 in this manner allows the ample and abundant processing power and memory in the cloud computing system 102 (which may comprise a large computing cluster) to be leveraged for faster message processing overall.

Note that, as contemplated herein, the protocol endpoint 116 specializes in processing communications that conform to a single application-layer protocol rather than multiple application-layer protocols. Although only the one protocol endpoint 116 is shown in FIG. 1A for the sake of simplicity in illustration, there may be many different protocol endpoints that specialize in different application-layer protocols operating within the on-premise system at any given time.

As one illustrative example of how the system shown in the network environment 100 may operate in practice, consider the following scenario. Initially, suppose the configuration service 122 that executes in the cloud computing system 102 pushes a configuration to the protocol endpoint 116. The configuration specifies an identifier that will be used by the cloud computing system 102 and the cloud application 124 to identify the protocol endpoint 116 (since the cloud computing system 102 and the cloud application 124 may also be configured to communicate with many other protocol endpoints in both the private network 110 and in other private networks associated with other entities). The configuration may also specify that the protocol endpoint 116 is to communicate with the cloud application 124 through the message broker 126 and provide a client certificate that authorizes the protocol endpoint 116 to communicate with the message broker 126. The configuration may also specify a configuration for the DNS server 118 and local certificates to use with the local application 114.

In one example of how control-interface communications may proceed, suppose a caller places an emergency call (e.g., a 911 call) via the caller device 120. As part of the process executed in the cloud computing system 102 for handling the call, a series of messages will be exchanged between the cloud application 124 and the local application 114. The cloud application 124 transmits a DNS resolution request (which is one example of a local hostname resolution query) to request transport parameters that identify the local application 114 via the message broker 126 to the protocol endpoint 116 via network 108. (The transport parameters are actual parameters that map to formal parameters defined by the application-layer protocol.) The transport parameters may comprise, for example a fully qualified domain name (FQDN) for the local application 114, a port number for a port that can be used to send media data to the local application 114, a domain name, a host name, or any combination thereof. The protocol endpoint 116 transmits the DNS resolution request to the DNS server 118 (which provides a local name resolution service for the private network 110 in this example, although an operating system (OS) host file could also be used to provide the local name resolution service) via the private network 110. In response, the DNS server 118 transmits the transport parameters to the protocol endpoint 116 via the private network 110. Once the protocol endpoint 116 receives the transport parameters from the DNS server 118, the protocol endpoint 116 transmits the transport parameters to the message broker 126 via the network 108. The message broker 126 transmits the transport parameters to the cloud application 124.

Upon receiving the transport parameters from the protocol endpoint 116, the cloud application 124 composes a first message for the local application 114. The first message conforms to an application-layer protocol. In this context, the "application layer" refers to the application layer in the Internet Protocol Suite as explained in the Request for Comment (RFC) 1123 published by the IETF. RFC 1123 is hereby incorporated by reference. Some examples of application-layer protocols include SIP, RTP, and HTTP. In one example, the first message is a SIP INVITE message as explained in the RFC 3261 published by the IETF. RFC 3261 is hereby incorporated by reference.

Next, the cloud application 124 transmits the first message together with the transport parameters to the protocol endpoint 116 via the network 108 and the message broker 126. The protocol endpoint 116 discerns that the transport parameters indicate the first message is destined for the local application 114, so the protocol endpoint 116 performs an operation specified by the application-layer protocol to effectuate a connection through the private network 110 between the protocol endpoint 116 and the local application 114. Once the connection is established, the protocol endpoint 116 transmits the first message to the local application 114 via the connection. Upon receiving the first message, the local application 114 consumes a payload included in the first message.

In response to the first message, the local application 114 may transmit a response message that is destined for the cloud application 124 to the protocol endpoint 116 via the connection. The protocol endpoint 116 transmits the response message along with the transport parameters and the identifier of the protocol endpoint 116 to the cloud application 124 via the network 108 and the message broker 126. The cloud application 124 further processes the response message within the cloud computing system 102 according to the application-layer protocol. For example, if the response message conforms to the SIP protocol, operations specified by the transaction layer and the dialog layer of SIP are performed by the cloud application.

While the connection between the protocol endpoint 116 and the local application may be closed when the call that triggered the cloud application 124 to send the first message ends, the protocol endpoint 116 maintains a persistent connection with the cloud application 124 via the network 108 (to the extent permitted by the firewall 106 and the firewall 105). This ensures that the protocol endpoint 116 is in a persistent state of readiness to facilitate communication between the cloud application 124 and any instances of the local application 114 that are executing on the on-premise systems 112.

With regard to how real-time-interface communications may proceed, consider the following example. In the example provided above, the protocol endpoint 116 specialized handling communications conforming to the SIP protocol and could therefore be described as a SIP endpoint. In this example, suppose that the protocol endpoint 116 specializes in handling communications conforming to the RTP (with a G.711 codec) protocol for communications through the network 108. In this example, the protocol endpoint 116 is a RTP endpoint (e.g., a media server) that is designed to run within the on-premise systems 112 and communicate media streams. In this example, the protocol endpoint 116 may communicate with the local application 114 in the RTP protocol using a first codec that is compatible with the local application 114 (e.g. the G.711 codec) and may communicate with the media relay 127 in the cloud computing system 102 in the WebRTC protocol using a second codec that is suitable for transmission over the network 108 (e.g., the Opus codec). Thus, in this example, the protocol endpoint 116 specializes in transcoding RTP to WebRTC.

In order for WebRTC to function as desired in this context, an Interactive Connection Establishment (ICE) process generally has to be used. The ICE process involves exchanging data about visible network entry points as seen by both parties of the connection in order to identify an ICE candidate pair which can be used by both parties. This process allows a path through the network 108 that will allow bidirectional flow of data to be identified. This ICE candidate negotiation calls for a separate and reliable communication mechanism. The protocol endpoints 116 can use the same messaging interface described above for SIP as this separate and reliable communication mechanism. So, even if the protocol endpoint 116 is an RTP endpoint (as described in this example) that relays media data, the protocol endpoint 116 does more than a mere media relay. Unlike a mere media relay, the protocol endpoint 116 splits the application-layer protocol by performing transport-related operations at the protocol endpoint 116 and lets non-transport aspects of the application-layer protocol be performed by the cloud application 124. The protocol endpoint 116 may include has some code for executing media negotiation with the cloud application 124, but the cloud application 124 is responsible for handling the media, recording the media, and performing other operations.

The media relay 127 may communicate with the client application 119 (e.g., a web-based front end comprising a user interface running in a browser or a native application) that is executing on the call-taking terminal 115. (Note that, in some examples, the client application 119 may be considered part of the cloud application 124.) Both the protocol endpoint 116 and the media relay 127 may be capable of relaying a media stream in real-time without changing a codec associated with the media stream, although it may generally be preferable to transcode media from a codec such as G.711 to a codec such as Opus. In scenarios where a few milliseconds of delay may be acceptable, the media stream may be compressed using a more efficient codec. By performing such a compression operation, the protocol endpoint 116 may increase usage efficiency of bandwidth associated with the network 108. Thus, the protocol endpoint 116 and the media relay 127 may provide real-time communication between the local application 114 and the cloud application 124 (and ultimately between the caller device 120 and the call-taking terminal 115).

Figure 8:
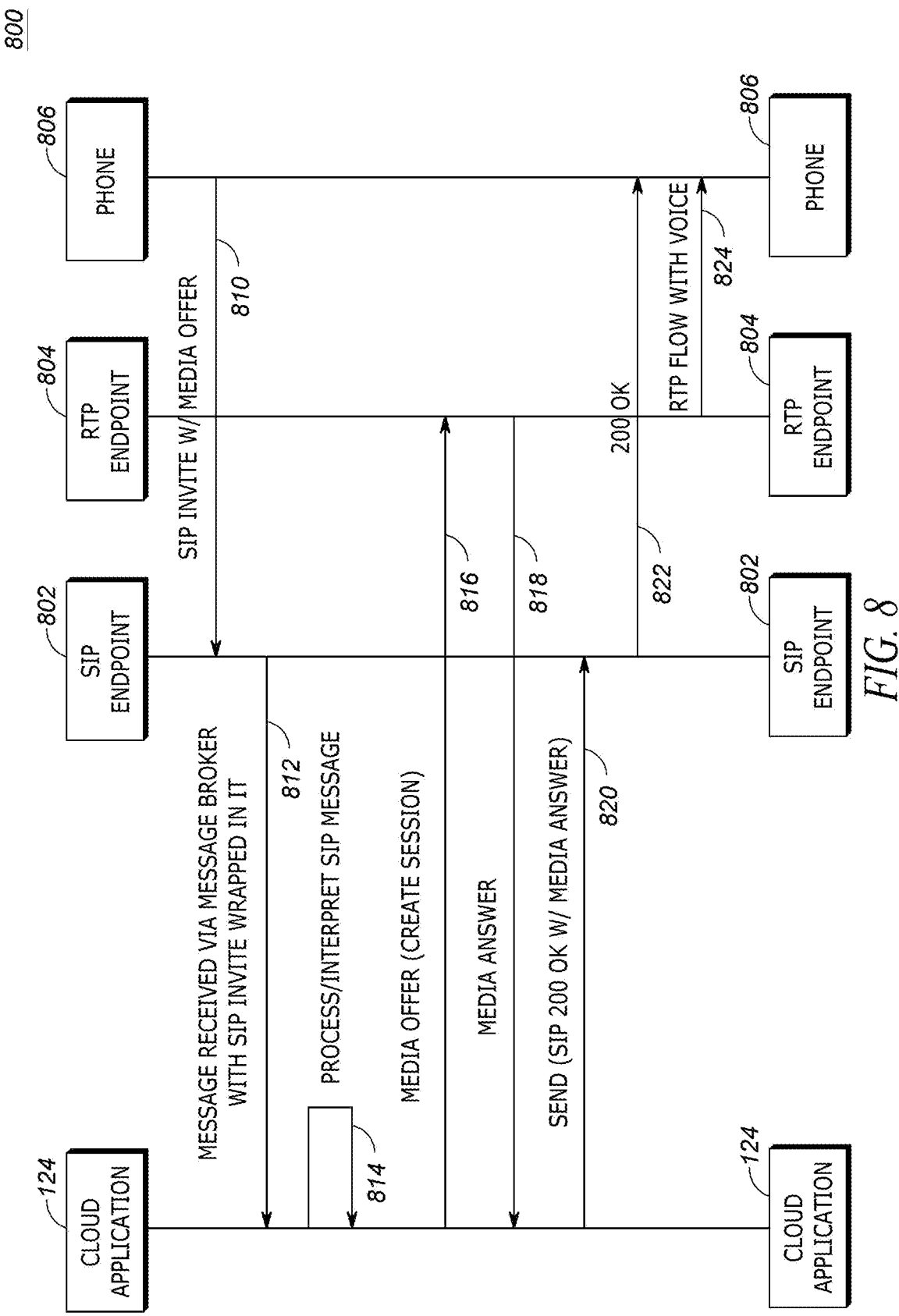
FIG. 8 illustrates a demonstration of how two protocol endpoints may work together to process electronic communications that are exchanged between a local application and a cloud application, according to one example.

Another illustrative example of how the system shown in the network environment 100 may operate in practice is illustrated in FIG. 8. FIG. 8 illustrates a message diagram 800, which illustrates how a simple phone call is made. As illustrated in FIG. 8, the cloud-based application orchestrates two different protocol endpoints (SIP endpoint 802 and RTP endpoint 804), each enacting its protocol's local presence in the private network as if it were present there. At arrow 810, a phone 806 (e.g., a SIP client) transmits a SIP invite with a media offer to the SIP endpoint 802. At arrow 812, the SIP endpoint 802, without reading or processing the invite, wraps the SIP invite in an event message and transmits the event message to a message broker (e.g., the message broker 126). At arrow 814, the cloud-based application 124 receives the event message from the message broker, and interprets the SIP message. At arrow 816, the cloud-based application 124, responsive to receiving the media offer, requests to create a session with the RTP endpoint 804. At arrow 818, the RTP endpoint 804 responds with a media answer to create the session. At arrow 820, the cloud-based application 124, responsive to the creation of the session, sends a SIP OK message, and a media answer corresponding to the media answer sent to the RTP endpoint 804, to the SIP endpoint 802. The SIP endpoint 802, at arrow 822, sends a SIP OK message to the phone 806, which, in response, establishes an RTP flow 824 with the RTP endpoint 804.

Returning to FIG. 1A, another benefit that the protocol endpoint 116 may provide is the ability to control how the connection to the cloud application 124 is achieved via multiple physical connections to the network 108. Although FIG. 1A shows a single connection between a single firewall (the firewall 106) and the network 108, the protocol endpoint 116 may also be able to manage multiple physical connections to the network 108 (e.g., through multiple firewalls) to enhance reliability and increase total capacity.

In addition, a site maintenance agent 111 may execute on hardware in the on-premise systems 112 and may serve to perform execute software development operations (DevOps) pipeline instructions provided by the DevOps agent 128. The DevOps agent 128 is a set of automated software processes and tools that allow software developers to transmit updated code to the site maintenance agent 111 for deployment in the protocol endpoint 116, thereby ensuring that the protocol endpoint 116 is kept up to date. This function performed by the site maintenance agent 111 may be helpful because no VPN is being used to achieve a direct connection.

The examples above focus on call-handling operations rather than call-routing operations. Note that, in different examples, the routing of the call to the call taker 117 may be performed either locally within the on-premise systems 112 or within the cloud computing system 102. If the call routing is not performed within the on-premise systems 112, "raw" calls that have not yet been routed to a specific call taker may be channeled by the protocol endpoint 116 to the cloud computing system 102 for routing before call-handling operations commence.

By operating in the manner described above, the system shown in the network environment 100 provides numerous advantages over existing solutions for facilitating secure, real-time, bidirectional digital communication between local applications executing in private networks (e.g., ESInets) and cloud applications executing in cloud computing systems.

Figure 1B:
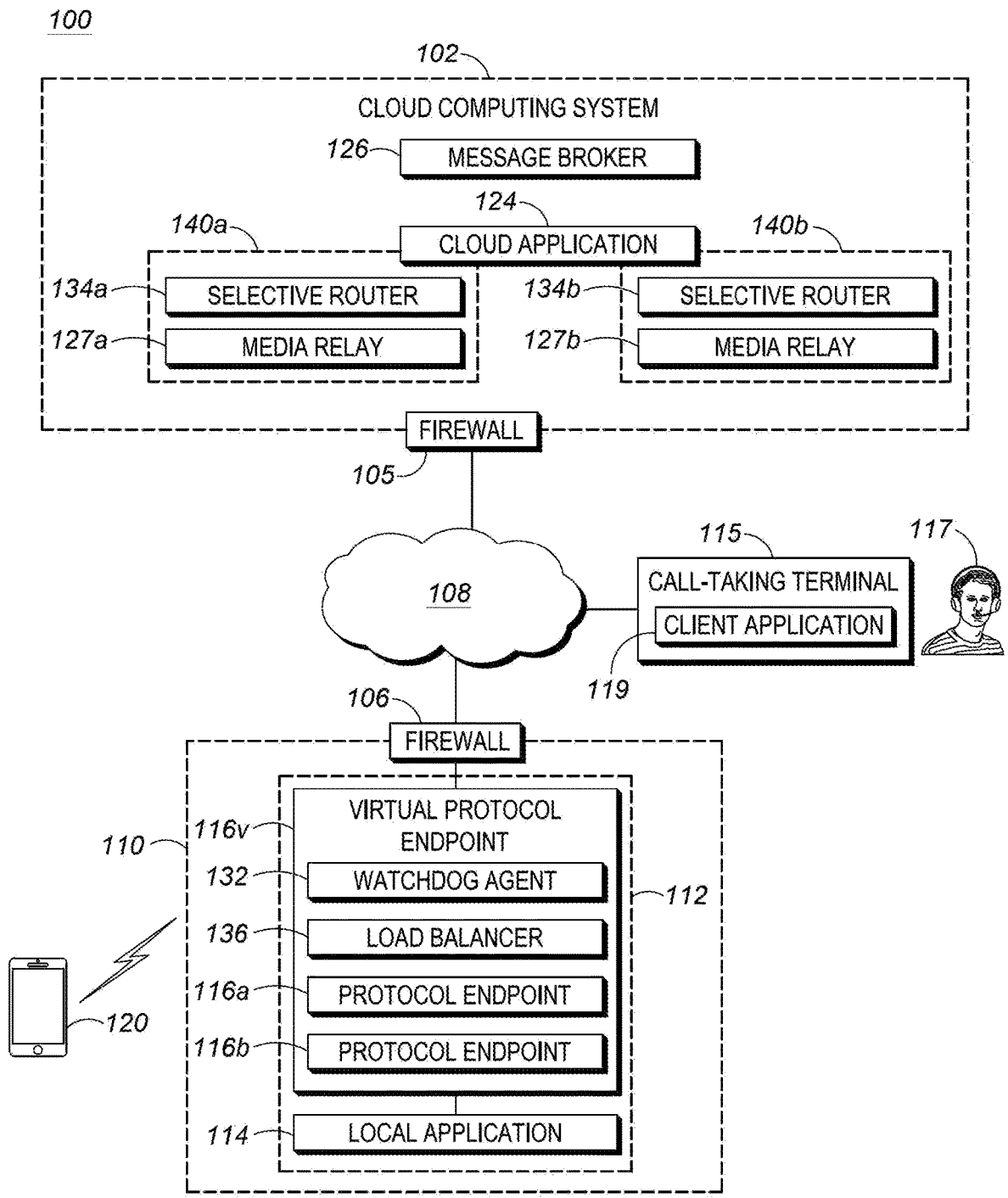
FIG. 1B illustrates the network environment with additional details that further show how systems described herein may be structured with virtual protocol endpoints to support additional capacity, according to one example.

FIG. 1B illustrates the network environment 100 with additional details that further show how systems described herein may be structured with virtual protocol endpoints to support additional capacity, according to one example. Some elements shown in FIG. 1A may be considered to be present in in FIG. 1B (e.g., the configuration service 122, the DevOps agent 128, the DNS server 118, and the site maintenance agent 111), but are not explicitly shown so that other elements can be emphasized.

In the example shown in FIG. 1B, the virtual protocol endpoint 116v is a logical entity that encompasses multiple instances of protocol endpoints (which may be executing on different physical hardware within the on-premise systems 112) such as the protocol endpoint 116a and the protocol endpoint 116b (persons of skill in the art will understand that a virtual protocol endpoint may encompass more instances of protocol endpoints). The protocol endpoint 116a and the protocol endpoint 116b (and other protocol endpoint instances included in the virtual protocol endpoint 116v) may collaborate with each other to scale a total capacity detected by the local application 114. The protocol endpoint 116a and the protocol endpoint 116b (and other protocol endpoint instances included in the virtual protocol endpoint 116v) may be installed behind the load balancer 136. The load balancer 136 may have a direct server return such that the protocol endpoint 116a and the protocol endpoint 116b (and other protocol endpoint instances included in the virtual protocol endpoint 116v) may share a single Internet Protocol (IP) address from the perspective of the local application 114. Furthermore, the protocol endpoint 116a and the protocol endpoint 116b (and other protocol endpoint instances included in the virtual protocol endpoint 116v) may, in some examples, use different WAN or Internet provider connections to scale available bandwidth towards the cloud application 124.

In this example, the cloud application 124 may be installed on both the computing cluster 140a and the computing cluster 140b (persons of skill in the art will understand that the cloud application 124 may also be installed on many more clusters in different examples). The computing cluster 140a and the computing cluster 140b may be geographically redundant (i.e., installed at different geographical locations). As shown, the computing cluster 140a includes a media relay 127a and a selective router 134a. Similarly, the computing cluster 140b includes a media relay 127b and a selective router 134b. The media relay 127a and the media relay 127b operate in the manner described for the media relay 127 (shown in FIG. 1A). The selective router 134a and the selective router 134b are software constructs that are apprised of the application-layer protocol and responsible for tagging and routing messages for as the protocol endpoint 116 (and other protocol endpoints).

To illustrate how the selective routers 134a, 134b may facilitate high availability and quality of a media stream, consider the following example. Suppose the protocol endpoint 116a is concurrently connected to both the media relay 127a and the media relay 127b. Also suppose that the protocol endpoint 116a concurrently sends an audio stream to the media relay 127a via WebRTC and a copy of that same audio stream to the media relay 127b via WebRTC. Since the protocol endpoint 116a may have multiple physical connections to the network 108 (e.g., as mentioned above with respect to FIG. 1A), the copy of the audio stream sent to the media relay 127a and the copy of the audio stream sent to the media relay 127b may be sent through different physical connections (though the copies of the audio stream may also be sent over the same physical connection in other examples). The selective router 134a and the selective router 134b may compare the two copies of the audio stream to determine which of the two copies currently has the best quality and select the better of the two copies to convey to the client application 119.

In another example, the client application 119 on the call-taking terminal 115 may concurrently receive an audio stream from the media relay 127a and a duplicate audio stream from the media relay 127b. If the media relay 127a suddenly goes down (e.g., crashes or freezes), the client application 119 can fall back on the duplicate audio stream received from the media relay 127b without the call taker 117 perceiving any disruption.

The load balancer 136 may perform client-side load balancing for the cloud application 124 across cluster 140a and cluster 140b. Furthermore, in this example, the virtual protocol endpoint 116v may be configured to implement high-availability protocols associated with the cloud application 124 such that the protocol endpoint 116a and the protocol endpoint 116b can each connect concurrently to both the computing cluster 140a and the computing cluster 140b, thereby ensuring redundancy such that at least one of the computing clusters 140a, 140b will be available as a backup of the other one of the computing clusters 140a, 140b fails. Thus, a media stream may continue flowing from the cloud application 124 to the virtual protocol endpoint 116v even if a cluster goes down unexpectedly. This ensures that real-time communications are not disrupted due to issues in the cloud computing system 102. In this example, the protocol endpoint 116a and the protocol endpoint 116b, under the guise of the virtual protocol endpoint 116v (which is virtual in this example), may relay real-time communications to the local application 114 in real-time protocol (RTP) and may relay real-time communications to the media relay 127a and the media relay 127b in the Web Real-Time Communication (webRTC) protocol (which may be used by the client application 119). Also, the protocol endpoint 116a and the protocol endpoint 116b can each maintain connections to the message broker 126 (e.g., for command-and-control communications).

The virtual protocol endpoint 116v is configured with three interfaces used to accomplish the communications described herein: a first interface that implements the first part of the application-layer protocol in the private network and 110 is configured to interact with the local application 114 via the private network 110, a second interface that implements a secure messaging protocol over the network 108 and is configured to communicate with the message broker 126, and a third interface that implements a secure real-time protocol over the network 108 and is configured to communicate with the media relays 127a, 127b (which are real-time streaming servers). In this example, the virtual protocol endpoint 116v is configured to perform content marshalling and unmarshalling specific to the application-layer protocol for the second interface. Furthermore, the virtual protocol endpoint 116v is configured to add an identifier that identifies the virtual protocol endpoint 116v to transmissions made via the second interface or the third interface. The virtual protocol endpoint 116v is also config- ured to authenticate with the cloud application 124 via the second interface or the third interface.

The virtual protocol endpoint 116v may further be configured with application protocol specific security parameters used by the local application 114 and with local network addressing parameters (within the private network 110).

In addition, the virtual protocol endpoint 116v may be configured to perform self-monitoring operations to gather system health data and report the system health data to the cloud application 124. The virtual protocol endpoint 116v may also include a watchdog agent 132 that is configured to restart the virtual protocol endpoint 116v if the virtual protocol endpoint 116v becomes unresponsive or shuts down unexpectedly.

Figure 2:
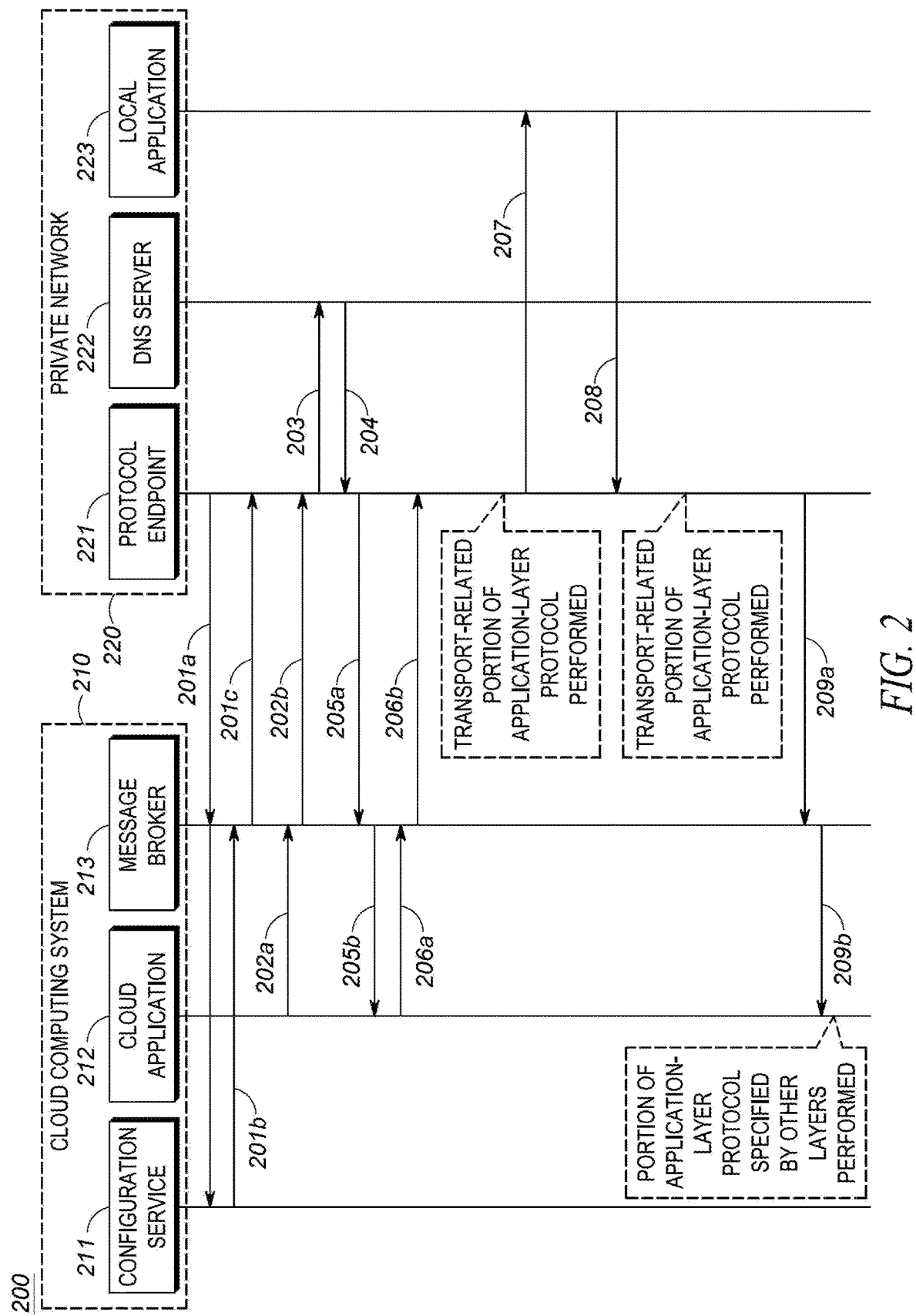
FIG. 2 includes a diagram that shows an illustrative example of a sequence of network communications that may occur in systems of the present disclosure.

FIG. 2 includes a diagram 200 that shows an illustrative example of a sequence of network communications that may occur in systems of the present disclosure. In the diagram 200, one local application 223, one cloud application 212, one protocol endpoint 221, one configuration service 211, and one DNS server 222 are shown. However, persons of skill in the art will understand that more or fewer of any of the elements shown may be used without departing from the spirit and scope of this disclosure. Similarly, more or fewer network communications than those shown may be used.

In this example, the configuration service 211 and the cloud application 212 that are executed in the cloud computing system 210 may communicate with the protocol endpoint 221 via the message broker 213 (which transmits communications to the protocol endpoint via a WAN such as the Internet). The protocol endpoint 221 may communicate with the DNS server 222 and the local application 223 via a private network (e.g., an ESInet).

At arrow 201a, the protocol endpoint 221 transmits a first communication to the message broker 213 to report the presence of the protocol endpoint 221 and to initiate a registration process with the cloud computing system 210. During the registration process, the protocol endpoint 221 may share data about a local configuration of the protocol endpoint 221 with the cloud application 212. Once the registration process is complete, at arrow 201b, the configuration service 211 transmits a configuration for the protocol endpoint 221 to the message broker 213. At arrow 201c, the message broker 213 transmits the configuration to the protocol endpoint 221. The configuration specifies an identifier that will be used by the cloud computing system 210 and the cloud application 212 to identify the protocol endpoint 221 (since the cloud computing system 210 and the cloud application 212 may also be configured to communicate with many other protocol endpoints in both the private network 220 and in other private networks). The configuration may also specify that the protocol endpoint 221 is to communicate with the cloud application 212 through the message broker 126 and provide a client certificate that authorizes the protocol endpoint 221 to communicate with the message broker 213. The configuration may also specify a configuration for the DNS server 222 and local certificates to use with the local application 223.

At arrow 202a, the configuration service 211 transmits a DNS resolution request for the protocol endpoint 221 to the message broker 213 to request transport parameters associated with the local application 223. At arrow 202b, the message broker 213 transmits the DNS resolution request to the protocol endpoint 221.

At arrow 203, the protocol endpoint 221 transmits the DNS resolution request to the DNS server 222 on behalf of the cloud application 212. The DNS serves provides DNS services for the private network 220.

At arrow 204, the DNS server 222 responds by transmitting the transport parameters to the protocol endpoint 221. Next, at arrow 205a, the protocol endpoint 221 transmits the transport parameters to the message broker 213. At arrow 205b, the message broker 213 transmits the transport parameters to the cloud application 212.

At arrow 206a, the cloud application 212 transmits a first message destined for the local application 223 to the message broker 213. At arrow 206b, the message broker 213 transmits the first message to the protocol endpoint 221. The first message conforms to an application-layer protocol. Upon receiving the first message and discerning that the transport parameters indicate that the first message is destined for the local application 223, the protocol endpoint 221 performs an operation specified by the application-layer protocol to effectuate a connection through the private network 220 between the protocol endpoint 221 and the local application 223.

Next, at arrow 207, the protocol endpoint 221 transmits the first message to the local application 223 via the connection. Upon receiving the first message, the local application 223 consumes a payload included in the first message.

At arrow 208, the local application 223 transmits a second message that is destined for the cloud application 212 to the protocol endpoint 221 via the connection. The protocol endpoint 221 performs an operation specified by the application-layer protocol (e.g., such as framing the response message with the transport parameters and with the identifier that indicates the protocol endpoint 221).

At arrow 209a, the protocol endpoint 221 transmits the second message along with the transport parameters and the identifier of the protocol endpoint 221 to the message broker 213. At arrow 209b, the message broker 213 transmits the second message to the cloud application 212. The cloud application 212 further processes the response message in accordance with the application-layer protocol by performing a portion of the application-layer protocol specified by other layers of the application-layer protocol. For example, if the second message conforms to the SIP protocol, operations specified by the transaction layer and the dialog layer of SIP are performed by the cloud application.

Figure 3:
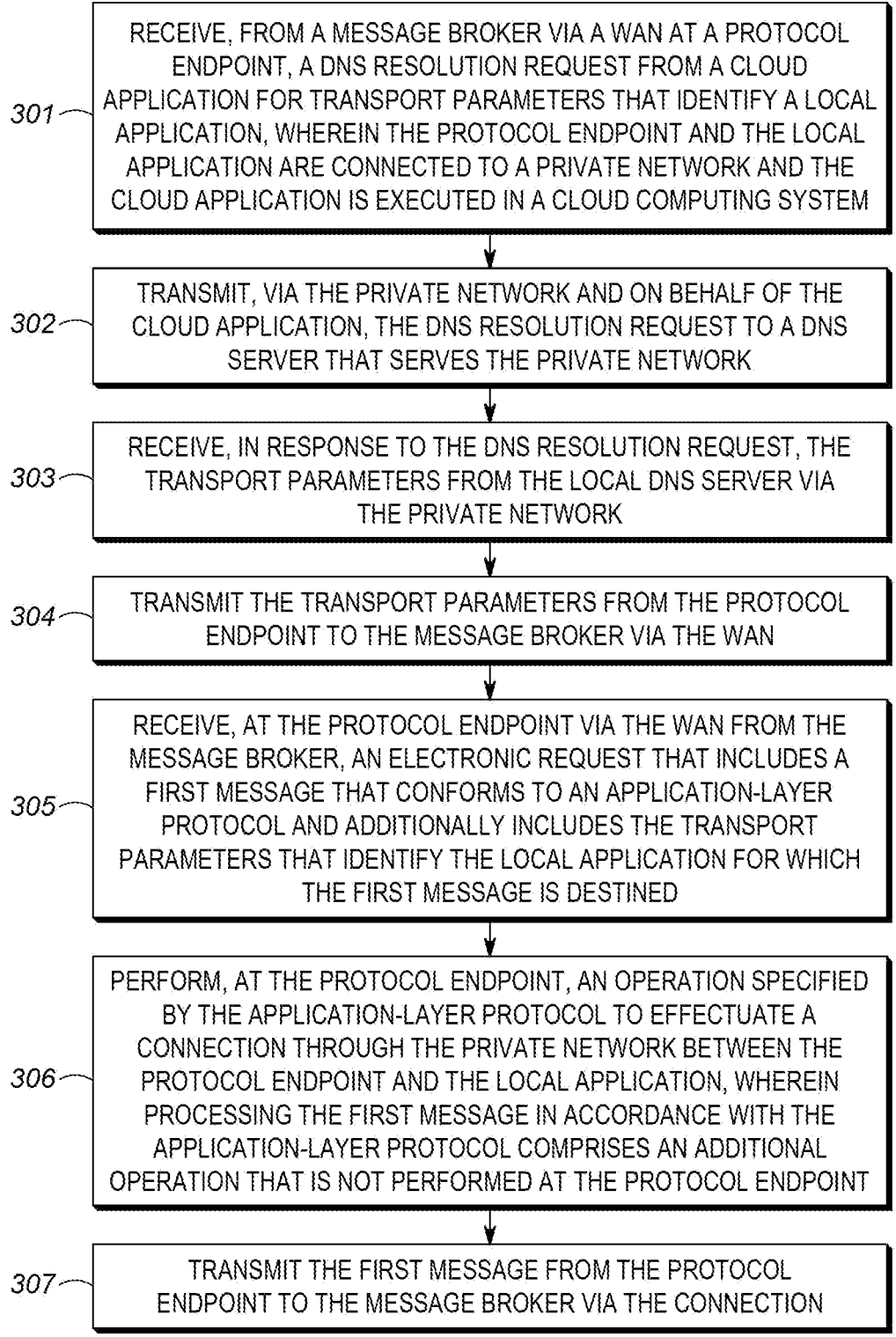
FIG. 3 illustrates functionality for systems disclosed herein, according to one example.

FIG. 3 illustrates functionality 300 for systems disclosed herein, according to one example. The functionality 300 does not have to be performed in the exact sequence shown. Also, various blocks may be performed in parallel rather than in sequence. Accordingly, the elements of the functionality 300 are referred to herein as "blocks" rather than "steps." The functionality 300 can be executed as instructions on a machine (e.g., by one or more processors), where the instructions are stored on a transitory or non-transitory computer-readable storage medium. While only seven blocks are shown in the functionality 300, the functionality 300 may comprise other actions described herein. Also, in some examples, some of the blocks shown in the functionality 300 may be omitted without departing from the spirit and scope of this disclosure.

As shown in block 301, the functionality 300 includes receiving, from a message broker via a WAN at a protocol endpoint, a DNS resolution request from a cloud application for transport parameters that identify a local application, wherein the protocol endpoint and the local application are connected to a private network and the cloud application is executed in a cloud computing system. In one example, the private network is an ESInet.

As shown in block 302, the functionality 300 includes transmitting, via the private network and on behalf of the cloud application, the DNS resolution request to a DNS server that serves the private network.

As shown in block 303, the functionality 300 includes receiving, in response to the DNS resolution request, the transport parameters from the local DNS server via the private network. The transport parameters may comprise, for example, a fully qualified domain name (FQDN), a port number, a host name, a domain name, or a combination thereof.

As shown in block 304, the functionality 300 includes transmitting the transport parameters from the protocol endpoint to the message broker via the WAN.

As shown in block 305, the functionality 300 includes receiving, at the protocol endpoint via the WAN from the message broker, an electronic request that includes a first message that conforms to an application-layer protocol and additionally includes the transport parameters that identify the local application for which the first message is destined. In one example, the application-layer protocol is SIP, and the first message is a SIP INVITE message.

As shown in block 306, the functionality 300 includes performing, at the protocol endpoint, an operation specified by the application-layer protocol to effectuate a connection through the private network between the protocol endpoint and the local application, wherein processing the first message in accordance with the application-layer protocol comprises an additional operation that is not performed at the protocol endpoint.

As shown in block 307, the functionality 300 includes transmitting the first message from the protocol endpoint to the message broker via the connection.

The functionality 300 may further include receiving, at the protocol endpoint from the local application via the connection, a second message that is destined for the cloud application; and transmitting the second message along with the transport parameters and an identifier of the protocol endpoint to the message broker via the WAN. The second message may conform to a protocol such as SIP, RTP, or HTTP.

The functionality may further include receiving, at the protocol endpoint via the WAN from a configuration service that is executing in the cloud computing system, a that provides: an identifier that identifies the protocol endpoint; additional endpoint parameters that may be specific to the application-layer protocol being implemented; a client certificate that authorizes the protocol endpoint to communicate with the message broker; and a set of local applications for which the protocol endpoint performs the operation specified by the application-layer protocol, wherein the set of local applications includes the local application. In one example, the message broker may comprise a set of Kafka entry points that are specified by the configuration. Persons of skill in the art will recognize that some configuration parameters may be provided during bootstrapping and other configuration parameters may be updated dynamically.

Figure 4A:
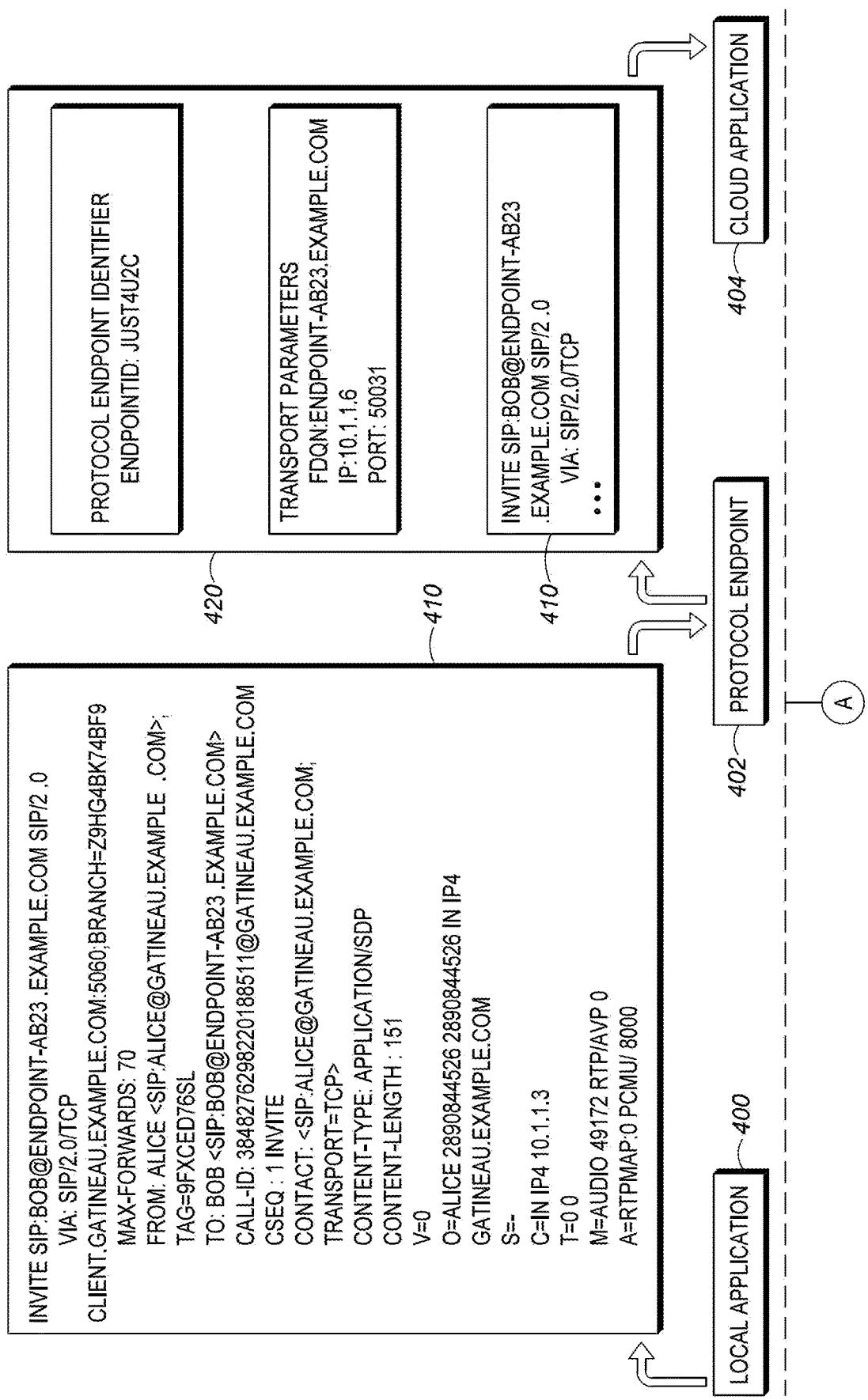
FIGS. 4A and B provide several illustrative messages that demonstrate how a protocol endpoint may process electronic communications that are exchanged between a local application and a cloud application, according to one example.
Figure 4B:
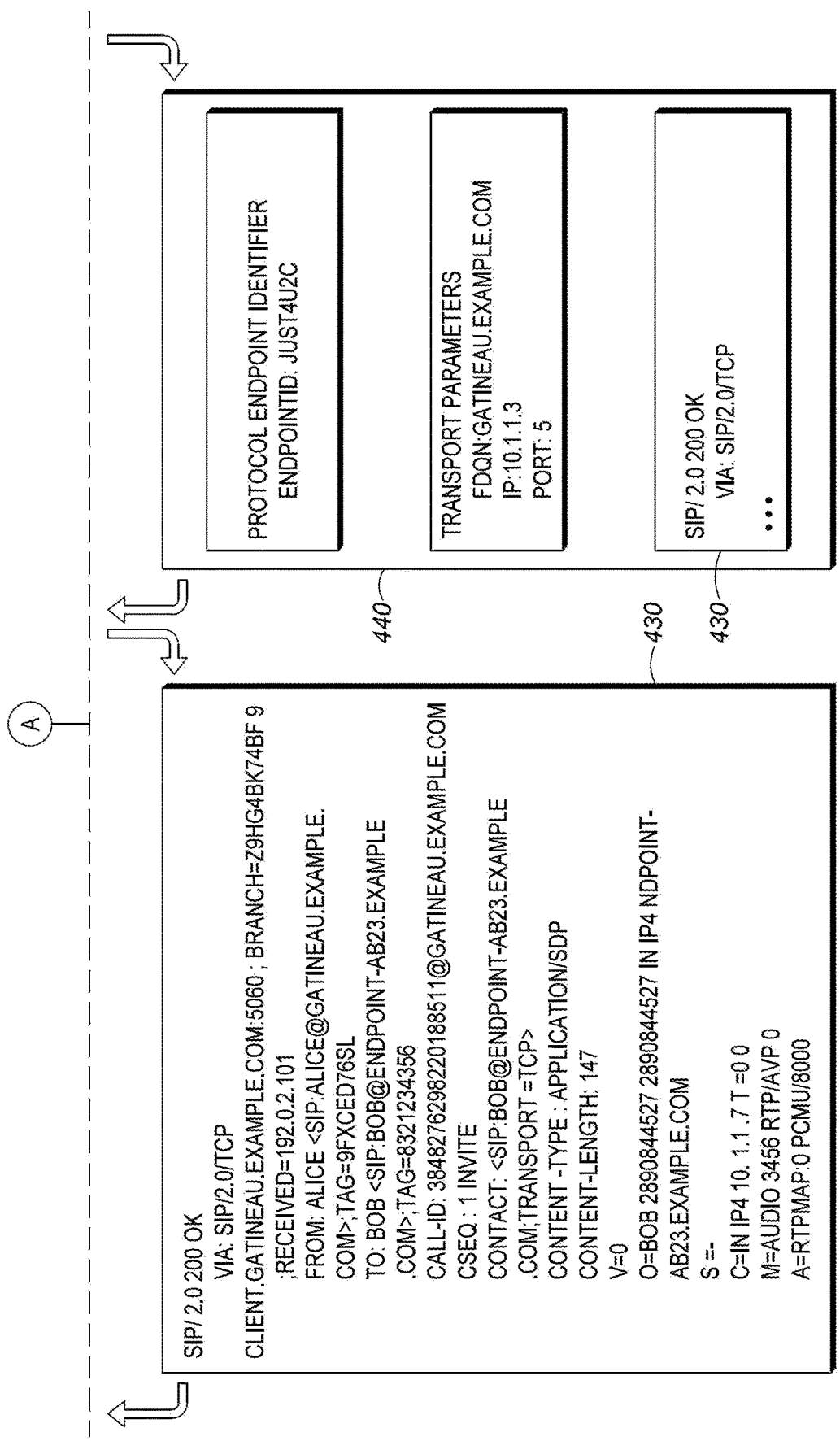

FIGS. 4A and B provide several illustrative messages that demonstrate how a protocol endpoint 402 may process electronic communications that are exchanged between a local application 400 and a cloud application 404, according to one example. Note that a message broker is used to convey messages between the cloud application 404 and the protocol endpoint 402, but the message broker is not shown FIGS. 4A and B so that the flow of messages can be more easily viewed.

In this example, the local application 400 transmits a raw SIP message 410 to the protocol endpoint 402 via a peer-to-peer connection that exists between the local application 400 and the protocol endpoint 402 over a private network. The protocol endpoint 402 includes the raw SIP message 410 into the payload of the message 420. As shown, the message 420 also includes transport parameters that identify the local application 400 and an identifier that identifies the protocol endpoint 402. The protocol endpoint 402 transmits the message 420 to the cloud application 404 via a persistent connection that exists between the protocol endpoint 402 and the cloud application 404 over a WAN.

The cloud application 404 receives the message 420, extracts the raw SIP message 410 therefrom, and further processes the raw SIP message 410. For example, as shown, the body of the raw SIP message 410 contains data that conforms to the Session Description Protocol (SDP) protocol (note that the SDP protocol is explained in the RFC 2327 published by the IETF and that RFC 2327 is hereby incorporated by reference). The cloud application 404 therefore performs operations specified by the transaction layer and the dialog layer of the SIP protocol stack (as opposed to the transport-layer operations that were performed at the protocol endpoint 402) and additionally performs media negotiation in accordance with the SDP protocol. Other adjacent processing related to the raw SIP message 410, such as operations specified by the RTP protocol or the DNS protocol, may also be performed at the cloud application 404.

Once the cloud application 404 has processed the raw SIP message 410, the cloud application generates a raw SIP message 430 that is destined for the local application 400. The cloud application includes the raw SIP message 430 in a message 440. As shown, the message 440 also includes the transport parameters that identify the local application 400 and the identifier that identifies the protocol endpoint 402. The cloud application 404 transmits the message 440 to the protocol endpoint 402 via the WAN.

Upon receiving the message 440, the protocol endpoint 402 extracts the raw SIP message 430 therefrom and transmits the raw SIP message 430 to the local application 400 via the peer-to-peer connection (e.g., via transfer control protocol (TCP) connection reuse based on the transport parameters included in the message 440).

Figure 5:
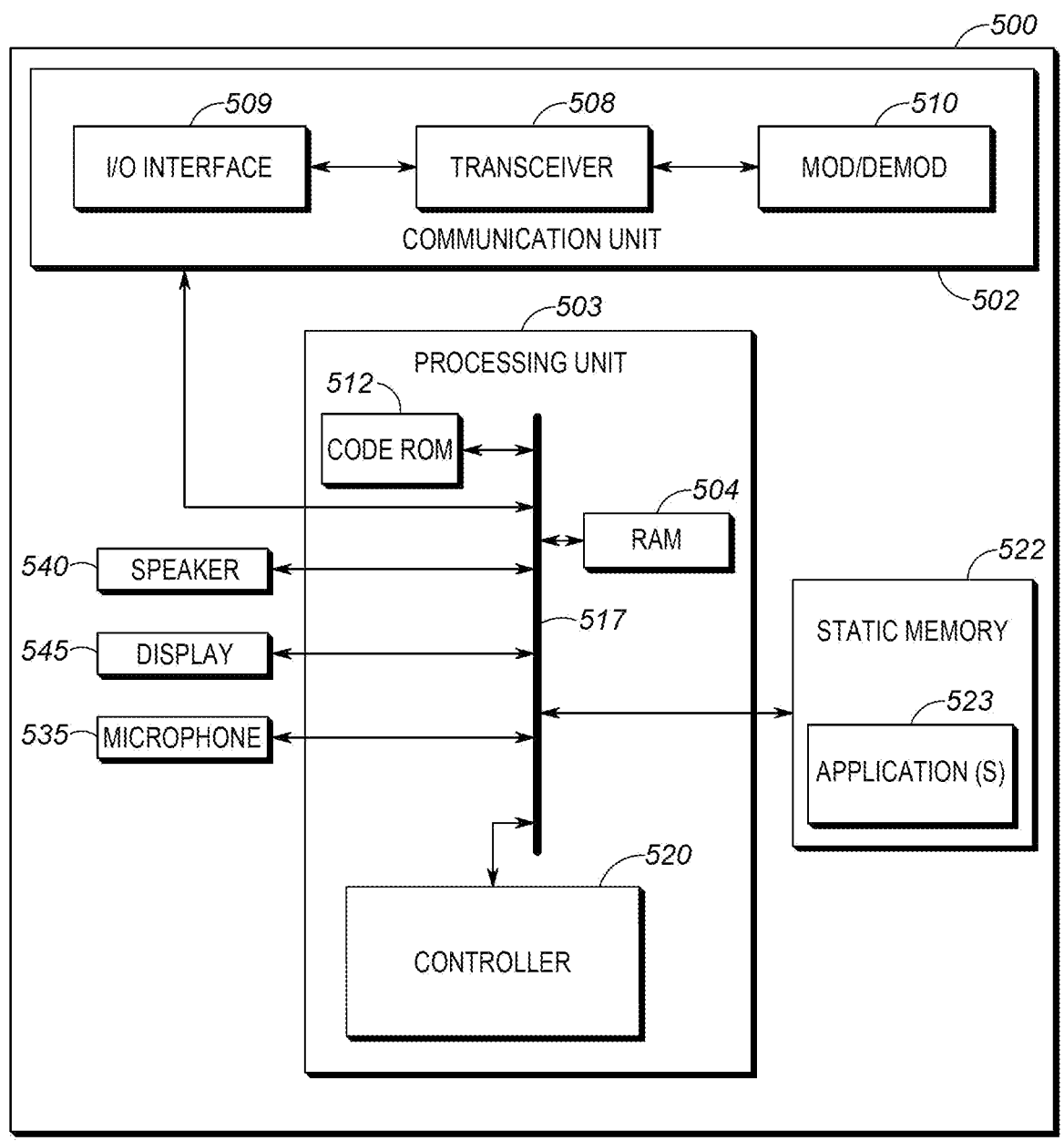
FIG. 5 illustrates a schematic block diagram of a telecommunication device, according to one example.

FIG. 5 illustrates a schematic block diagram of a telecommunication device 500, according to one example. The telecommunication device 500 may be configured to receive an emergency call routed from a cloud computing system to the telecommunication device via one or more different types of networks (e.g., networks with which the transceivers 508 may be adapted to communicate, as discussed in further detail below).

The telecommunication device 500 may comprise a cellular phone (e.g., a smart phone), a satellite phone, a Voice over Internet Protocol (VoIP) phone, or a computer (e.g., a workstation, a laptop, a mobile tablet or a desktop computer) that is equipped with peripherals for answering calls (e.g., a headset comprising headphones and a microphone).

As depicted, the telecommunication device 500 comprises a communication unit 502, a processing unit 503 (e.g., a processor), a Random-Access Memory (RAM) 504, one or more transceivers 508 (which may be wireless transceivers), one or more wired or wireless input/output (I/O) interfaces 509, a combined modulator/demodulator 510 (which may comprise a baseband processor), a code Read-Only Memory (ROM) 512, a common data and address bus 517, a controller 520, and a static memory 522 storing one or more applications 523.

The telecommunication device 500 may also include a speaker 540, a display 545, and a microphone 535 such that a user (e.g., a call taker) may use the telecommunication device 500 to answer calls (e.g., by listening to a caller via the speaker 540 and speaking to the caller via the microphone 535) and view output of the one or more applications 523 on the display 545.

As shown in FIG. 5, the telecommunication device 500 includes the communication unit 502 communicatively coupled to the common data and address bus 517 of the processing unit 503. The processing unit 503 may include the code Read Only Memory (ROM) 512 coupled to the common data and address bus 517 for storing data for initializing system components. The processing unit 503 may further include the controller 520 coupled, by the common data and address bus 517, to the Random-Access Memory 504 and the static memory 522. Persons of skill in the art will recognize that other configurations (e.g., configurations that include multiple buses) may also be used without departing from the spirit and scope of this disclosure.

The communication unit 502 may include one or more wired or wireless input/output (I/O) interfaces 509 that are configurable to communicate with other components and devices. For example, the communication unit 502 may include one or more transceivers 508 or wireless transceivers may be adapted for communication with one or more communication links or communication networks used to communicate with other components or computing devices. For example, the one or more transceivers 508 may be adapted for communication with one or more of the Internet (including public and private Internet Protocol (IP) networks), a Bluetooth network, a Wi-Fi network, for example operating in accordance with an Institute of Electrical and Electronics Engineers (IEEE) 802.11 standard (e.g., 802.11a, 802.11b, 802.11g, 802.11ax), a 3G standard network (including Global System for Mobiles (GSM) and Code Division Multiple Access (CDMA) standards), an LTE (Long-Term Evolution) network or other types of GSM networks, a 5G (including a network architecture compliant with, for example, the Third Generation Partnership Project (3GPP) Technical Specification (TS) 23 specification series and a new radio (NR) air interface compliant with the 3GPP TS 38 specification series) standard network, a Citizens Broadband Radio Service (CBRS), Worldwide Interoperability for Microwave Access (WiMAX) network, for example operating in accordance with an IEEE 802.16 standard, a landline telephonic network, a Low Earth Orbit (LEO) network (e.g., for satellite phones or Internet connection), a Geosynchronous Orbit (GEO) network (e.g., for satellite phones), an Evolution-Data Optimized (EV-DO) network, an Enhanced Data Rates for Global Evolution (EDGE) network, or another similar type of wireless network. Hence, the one or more transceivers 508 may include, but are not limited to, a cell phone transceiver, a Bluetooth transceiver, a CBRS transceiver, a Wi-Fi transceiver, a WiMAX transceiver, or another similar type of wireless transceiver configurable to communicate via a wireless radio network.

The one or more transceivers 508 may also comprise one or more wired transceivers, such as an Ethernet transceiver, a USB (Universal Serial Bus) transceiver, or similar transceiver configurable to communicate via a twisted pair wire, a coaxial cable, a fiber-optic link, or a similar physical connection to a wired network. The one or more transceivers 508 are also coupled to a combined modulator/demodulator 510.

The controller 520 may include ports (e.g., hardware ports) for coupling to other hardware components or systems (e.g., components and systems described in FIG. 1). The controller 520 may also comprise one or more logic circuits, one or more processors, one or more microprocessors, one or more ASIC (application-specific integrated circuits), one or more FPGA (field-programmable gate arrays), or another electronic device.

The static memory 522 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory), or a volatile storage unit (e.g., random-access memory ("RAM")). In the example of FIG. 5, programming instructions (e.g., machine readable instructions) that implement the functional teachings of the telecommunication device 500 as described herein are maintained, persistently, at the static memory 522 and used by the controller 520, which makes appropriate utilization of volatile storage during the execution of such programming instructions.

When the controller 520 executes the one or more applications 523, the controller 520 is enabled to perform one or more of the aspects of the present disclosure set forth earlier in the present specification (e.g., the telecommunication device blocks set forth in FIGS. 2 and 3). The one or more applications 523 may include programmatic algorithms, and the like, that operable to facilitate communication between a caller and a call taker and are operable to allow the call taker to access databases, dispatch emergency response personnel, and perform other electronic functions associated with emergency response systems.

Figure 6:
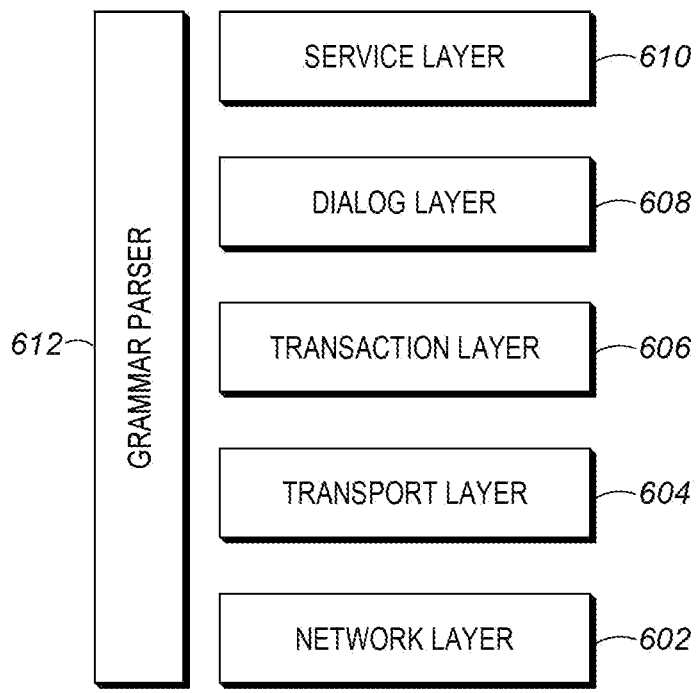
FIG. 6 illustrates SIP protocol stack, according to one example.

FIG. 6 illustrates SIP protocol stack 600, according to one example. As shown, the SIP protocol stack 600 may comprise a network layer 602, a transport layer 604, a transaction layer 606, a dialog layer 608, and a service layer 610. Each of the layers 602-610 is part of the application-layer protocol defined by SIP.

The network layer 602 provides Internet protocol (IP) connectivity that allows SIP elements (e.g., a user agent client (UAC), a user agent server (UAS), a proxy server, a registrar server, a redirect server, and a location server) to communicate over an IP network.

The transport layer 604 specifies how both servers and clients send requests and receives responses over the network. A SIP server receives requests that conform to SIP, processes those requests, and transmits responses to those requests. The transport layer 604 is also specifies how SIP messages are to be framed before those SIP messages are transmitted across the network.

As shown, the transaction layer 606 sits above the transport layer. A transaction is a request sent by a client transaction (using the transport layer) to a server transaction, along with all responses to that request sent from the server transaction back to the client. The transaction layer enforces compliant message sequences and retransmits and filters duplicate SIP messages if operations specified by the transport layer 604 are not performing reliably. Any task that a user agent client (UAC) accomplishes is effectuated via a series of transactions.

The service layer 610 (i.e., the transaction user (TU)) sits above the transaction layer 606. The service layer 610 represents an application that executes on top of the SIP protocol stack 600 and provides the element-specific functionality.

In some examples, the dialog layer 608 may be situated between the service layer 610 and the transaction layer 606. A SIP dialog identifies a set of related transactions. For example, in a phone call (e.g., an emergency phone call), setup and tear down are two related transactions within a single SIP dialog. The dialog layer 608 is enforces compliant transaction sequences and addresses any deficiencies detected.

SIP elements send requests and responses to other SIP elements in the form of SIP messages. SIP messages contain data that specifies, for example, source address or Uniform Resource Indicator (URI), destination address, routing details, call identifiers, sequence numbers, and other parameters that will be recognized by persons of skill in the art.

The SIP message format header information may be arranged within a message in many different orders, so some messages that appear different may ultimately contain the same data. For example, SIP does not specify in which order many of the headers should appear in a SIP message. Furthermore, SIP headers are generally not case sensitive, and code written by different entities may construct SIP messages in different ways. Nevertheless, cross compatibility is supposed to exist between the SIP stacks applied by different entities. For this reason, the grammar parser 612 is included in the SIP protocol stack 600. The grammar parser 612 parses SIP messages and extracts data pertinent to each of the layers 602-610. The grammar parser 612 is able to extract header data and parameter data from many different formats that conform to the SIP protocol. For example, the grammar parser 612 can handle upper-case and lower-case letters, characters, and different schemes of header separation (e.g., line-feed characters, spaces, semi-colons, and tab characters). The grammar parser 612 thus provides complex parsing functionality.

As described above with respect to FIGS. 1A-4B, the protocol endpoints described herein provide a change in how application-layer protocol stacks such as the SIP protocol stack 600 have been implemented in previous systems. In the systems described herein, the bottom two layers of the SIP protocol stack 600 (i.e., the transport layer 604 and the network layer 602) are implemented at a protocol endpoint, but the service layer 610, the dialog layer 608, and the transaction layer 606 are implemented in a cloud application.

Figure 7:
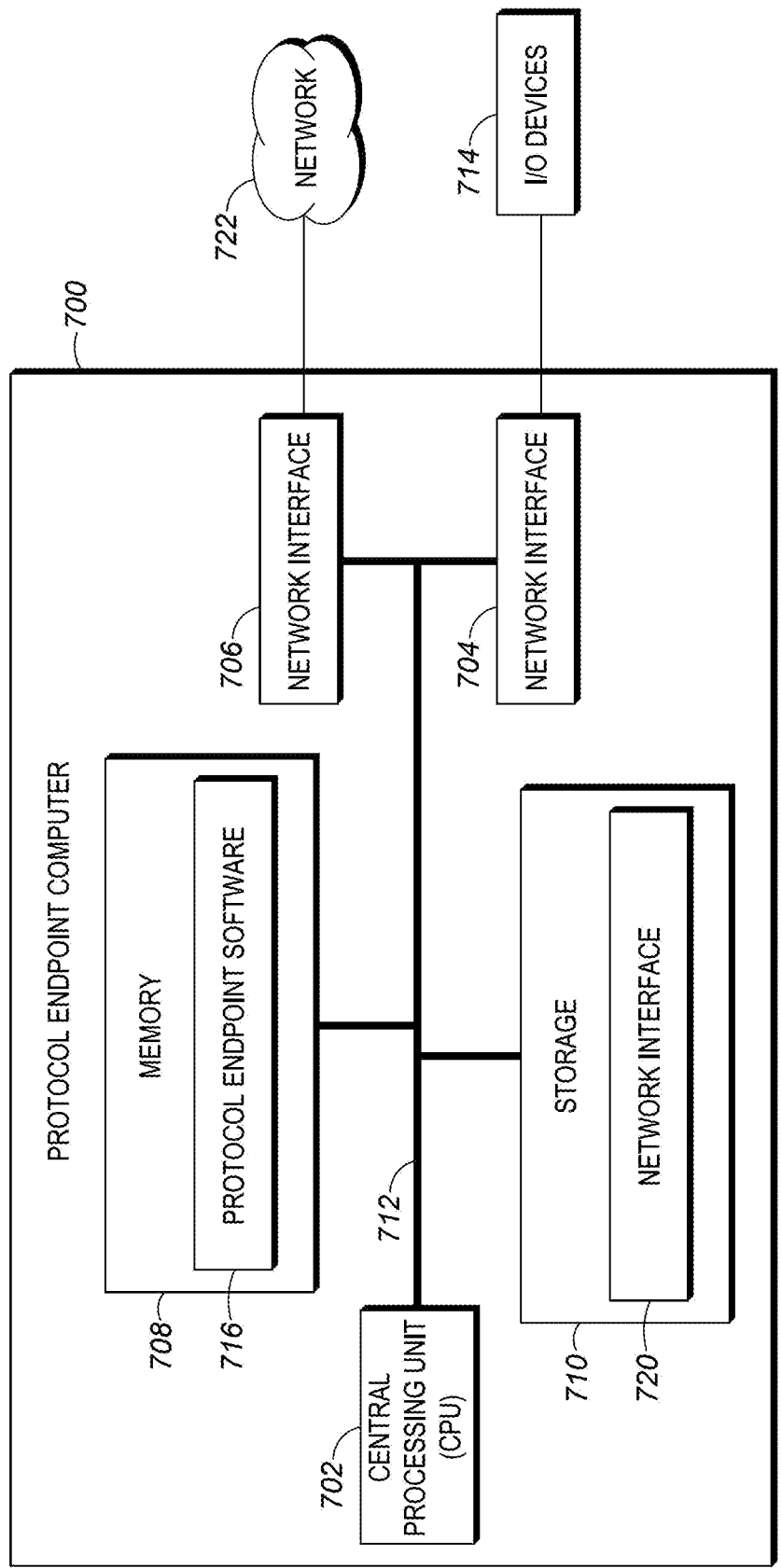
FIG. 7 illustrates a protocol endpoint computer that functions as described with respect to FIGS. 1A-4B, according to one example.

FIG. 7 illustrates a protocol endpoint computer 700 that functions as described above with respect to FIGS. 1A-4B, according to one example. As shown, the protocol endpoint computer 700 comprises a central processing unit (CPU) 702 and an input/output (I/O) device interface 704 that allows I/O devices 714 (e.g., a keyboard, a mouse, or a touch screen) to be connected to the protocol endpoint computer 700. The protocol endpoint computer 700 also comprises a network interface 706, a memory 708, storage 710, and an interconnect 712 (e.g., a common data and address bus).

The CPU 702 may retrieve application data and programming instructions from the memory 708 and execute those programming instructions. The interconnect 712 provides a digital transmission path through which the CPU 702, the I/O device interface 704, the network interface 706, the memory 708, and the storage 710 can transmit data and programming instructions amongst each other. While the CPU 702 is shown as a single block, persons of skill on the art will understand that the CPU may represent a single CPU, a plurality of CPUs, a CPU with a plurality of processing cores, or some other combination of processor hardware.

The memory 708 may be random access memory (RAM) and the storage 710 may be non-volatile storage. Persons of skill in the art will understand that the storage 710 may comprise any combination of internal or external storage devices (e.g., disc drives, removable memory cards or optical storage, solid state drives (SSDs), network attached storage (NAS), or a storage area-network (SAN)). Configuration data 720 may be located in the storage 710.

As shown, the protocol endpoint software 716 may be stored in the memory 708 and may function as described with respect to FIGS. 1A-4B. Network communications may be received or sent via the networks 722 (e.g., the Internet and a private network).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot execute multiple actions specified by application-layer protocols for processing messages, among other features and functions set forth herein).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1%, and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Examples are herein described with reference to flowchart illustrations and/or block diagrams of methods, apparatus (systems) and computer program products according to various examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

EXAMPLES

The following additional examples are included below to highlight several aspects of the systems and processes described herein. However, the scope of the disclosure is not limited to these additional examples, or the other examples described herein.

Example 1 includes a system that allows a cloud application connected to a wide area network (WAN) to establish a local presence with applications connected to at least one private network concurrently, independently, and bi-directionally, the system comprising: at least one protocol endpoint installed on hardware connected to at least one private network and configured to interface with at least one local application that implements an application-layer protocol and that is behind a firewall for the at least one private network, wherein the at least one protocol endpoint is configured to implement a first part of the application-layer protocol, and wherein the first part specifies operations for message framing and socket identification and does not specify operations that are not related to transporting messages; a cloud application deployed in the WAN and configured to implement a remainder part of the application-layer protocol, wherein the remainder part of the application-layer protocol implements domain logic and transactional operations and does not specify operations related to transporting messages; a messaging broker cluster deployed in the WAN and configured to dispatch messages between the at least one protocol endpoint and the cloud application; and at least one real-time streaming server deployed in the WAN and configured to relay real-time traffic between the at least one protocol endpoint and the cloud application.

Example 2 includes the system of example 1, wherein the at least one protocol endpoint is further configured with: a first interface that implements the first part of the application-layer protocol in the private network and is configured to interact with the at least one local application via the private network; a second interface that implements a secure messaging protocol over the WAN and is configured to communicate with the messaging broker cluster; and a third interface that implements a secure real-time protocol over the WAN and is configured to communicate with the at least one real-time streaming server.

Example 3 includes the system of example 2, wherein the at least one protocol endpoint is further configured to perform transcoding that is specific to the application-layer protocol for the second interface and the third interface.

Example 4 includes the system of example 2 or 3, wherein the at least one protocol endpoint is further configured to add an identifier for the at least one protocol endpoint to transmissions made via the second interface or the third interface.

Example 5 includes the system of example 2, 3, or 4, wherein the at least one protocol endpoint is further configured to authenticate with the cloud application via the second interface or the third interface.

Example 6 includes the system of example 1, 2, 3, 4, or 5, further comprising: a software agent installed on hardware connected to the private network and configured to execute software development operations (DevOps) instructions from a DevOps agent deployed in the WAN.

Example 7 includes the system of example 1, 2, 3, 4, 5, or 6, further comprising: a local name resolution service.

Example 8 includes the system of example 7, wherein the at least one protocol endpoint is further configured to submit local hostname resolution queries to the local name resolution service on behalf of the cloud application.

Example 9 includes the system of example 1, 2, 3, 4, 5, 6, 7, or 8, wherein the at least one protocol endpoint is configured to use different WAN internet provider connections to achieve high availability and increase available bandwidth towards the cloud application.

Example 10 includes the system of example 1, 2, 3, 4, 5, 6, 7, 8, or 9, wherein the cloud application includes a client application capable of receiving real-time data.

Example 11 includes the system of example 1, 2, 3, 4, 5, 6, 7, 8, 9, or 10, further comprising: at least one media server deployed in the WAN and configured to relay real-time traffic between the at least one protocol endpoint and the cloud application.

Example 12 includes the system of example 1, 2, 3, 4, 5, 6, 7, 8, 9, 10, or 11, wherein the cloud application is installed on a plurality of computing clusters that are located at different geographical locations.

Example 13 includes the system of example 12, wherein the at least one protocol endpoint is further configured to perform client-side load balancing for the cloud application amongst the plurality of computing clusters that are located at the different geographical locations.

Example 14 includes the system of example 13, wherein the at least one protocol endpoint is further configured to implement high-availability protocols associated with the cloud application such that the at least one protocol endpoint can connect concurrently to multiple clusters selected from the plurality of computer clusters, thereby ensuring that at least one backup cluster is available if another cluster fails.

Example 15 includes the system of example 1, 2, 3, 4, 5, 6, 7, 8, 9, 10, 11, 12, 13, or 14, wherein the at least one protocol endpoint is further configured with application protocol specific security parameters used by the at least one local application.

Example 16 includes the system of example 1, 2, 3, 4, 5, 6, 7, 8, 9, 10, 11, 12, 13, 14, or 15, wherein the at least one protocol endpoint is further configured with local network addressing parameters.

Example 17 includes the system of example 1, 2, 3, 4, 5, 6, 7, 8, 9, 10, 11, 12, 13, 14, 15, or 16, wherein the at least one protocol endpoint is further configured to register with the cloud application and share data about a local configuration of the at least one protocol endpoint with the cloud application.

Example 18 includes the system of example 1, 2, 3, 4, 5, 6, 7, 8, 9, 10, 11, 12, 13, 14, 15, 16, or 17, wherein the at least one protocol endpoint is further configured to perform compression operations to increase usage efficiency of bandwidth associated with the WAN.

Example 19 includes the system of example 1, 2, 3, 4, 5, 6, 7, 8, 9, 10, 11, 12, 13, 14, 15, 16, 17, or 18, wherein the at least one protocol endpoint is further configured to perform self-monitoring operations to gather system health data and report the system health data to the cloud application.

Example 20 includes the system of example 1, 2, 3, 4, 5, 6, 7, 8, 9, 10, 11, 12, 13, 14, 15, 16, 17, 18, or 19, wherein the at least one protocol endpoint is further configured to restart the at least one protocol endpoint if the at least one protocol endpoint becomes unresponsive or shuts down unexpectedly.

Example 21 includes the system of example 1, 2, 3, 4, 5, 6, 7, 8, 9, 10, 11, 12, 13, 14, 15, 16, 17, 18, 19, or 20, wherein the at least one protocol endpoint is configured to be a part of a virtual protocol-endpoint logical entity and collaborate with additional protocol endpoints to scale a total capacity detected by the local application.

Example 22 includes the system of example 21, wherein the at least one protocol endpoint and the additional protocol endpoints are installed behind a local load balancer configured with direct server return, such that the at least one protocol endpoint and the additional protocol endpoints share a single Internet Protocol (IP) address from a perspective of the local application.

Example 23 includes a method comprising: receiving, at a protocol endpoint via a private network from a local application that is behind a firewall that protects the private network, a message that conforms to an application-layer protocol and is destined for a cloud application; partially processing the message by performing operations specified by a transport layer of the application-layer protocol at the protocol endpoint without performing operations specified by other layers of the application-layer protocol; transmitting the message to the cloud application via a wide area network (WAN) and a message broker; upon receiving the message at the cloud application, further processing the message at the cloud application by performing the operations specified by the other layers of the application-layer protocol.

Example 24 includes a system for establishing a local presence on a private network to bidirectionally connect a cloud-based application with a local application on the private network. The system comprises a protocol endpoint operating on hardware connected to the private network and configured to interface with the local application, wherein the local application is behind a firewall of the private network and implements an application-layer protocol, wherein the protocol endpoint is configured to implement a first part of the application-layer protocol, and wherein the first part of the application-layer protocol includes only transport-related operations.

Example 25 includes the system of example 24, wherein transport-related operations include at least one selected from a group consisting of message framing, connection management and reuse, port binding, transmitting and receiving, target resolution, transport layer security and network socket management.

Example 26 includes the system of examples 24 or 25, and further comprises: a cloud computing system communicatively coupled to the private network via a wide-area-network, wherein the cloud-based application is deployed in the cloud computing system and is configured to implement a second part of the application-layer protocol, and the second part of the application-layer protocol includes only non-transport-related operations.

Example 27 includes the system of example 26, wherein non-transport-related operations includes at least one selected from the group consisting of domain logic and transactional operations.

Example 28 includes the system of example 26, wherein the cloud computing system further includes: a message broker cluster configured to dispatch messages between the protocol endpoint and the cloud-based application; and a real-time streaming server configured to relay real-time traffic between the protocol endpoint and the cloud-based application.

Example 29 includes the system of examples 24, 25, 26, 27, or 28, wherein the protocol endpoint includes: a first interface that implements the first part of the application-layer protocol in the private network and is configured to interact with the local application via the private network; and a second interface that implements a secure messaging protocol via a wide-area-network communicatively coupled to the private network and the cloud computing system, wherein the second interface is configured to communicate with the message broker cluster.

Example 30 includes the system of example 29, wherein the protocol endpoint is further configured to perform content marshalling and unmarshalling specific to the application-layer protocol for the second interface.

Example 31 includes the system of example 29, wherein the protocol endpoint includes: a third interface that implements a secure real-time protocol via a wide-area-network communicatively coupled to the private network and the cloud computing system, wherein the third interface is configured to communicate with the real-time streaming server.

Example 32 includes the system of example 31, wherein the protocol endpoint is further configured to perform transcoding specific to the application-layer protocol for the third interface.

Example 33 includes the system of example 31, wherein the protocol endpoint is further configured to add an identifier for the protocol endpoint to transmissions made via the second interface and the third interface.

Example 34 includes a system of examples 26, 27, 28, 29, 30, 31, 32, or 33, further comprising: a software agent installed on hardware connected to the private network, the software agent configured to execute software development operations (DevOps) instructions from a DevOps agent deployed in the cloud-based environment.

Example 35 includes a system of examples 24, 25, 26, 27, 28, 29, 30, 31, 32, 33, or 34, wherein the protocol endpoint is configured to use multiple wide-area-network connections to achieve high availability and increase available bandwidth towards the cloud-based application.

Example 36 includes a system of examples 24, 25, 26, 27, 28, 29, 30, 31, 32, 33, 34, or 35, wherein the cloud-based application includes a client application capable of receiving real-time data.

Example 37 includes a system of examples 24, 25, 26, 27, 28, 29, 30, 31, 32, 33, 34, 35 or 36, wherein the protocol endpoint is further configured to implement high-availability protocols associated with the cloud-based application such that the protocol endpoint can connect concurrently to a plurality of computing nodes that are located at different geographical locations.

Example 38 includes a system of examples 24, 25, 26, 27, 28, 29, 30, 31, 32, 33, 34, 35, 36 or 37, wherein the protocol endpoint is further configured to perform self-monitoring operations to gather system health data and report the system health data to the cloud-based application.

Example 39 includes a system of examples 24, 25, 26, 27, 28, 29, 30, 31, 32, 33, 34, 35, 36, 37 or 38, wherein the protocol endpoint is part of a virtual protocol-endpoint logical entity and is configured to collaborate with additional protocol endpoints to scale to a total capacity determined by the local application.

Example 40 includes a method for establishing a local presence on a private network to bidirectionally connect a cloud-based application with a local application on the private network, the method comprising: receiving, by a protocol endpoint residing on the private network from the local application, a message destined for the cloud-based application, wherein the message conforms to an application-layer protocol implemented by the local application; responsive to receiving the message, partially processing the message by performing, with the protocol endpoint, only transport-related operations of the application-layer protocol without performing non-transport-related operations of the application-layer protocol; transmitting, with the protocol endpoint, the message to the cloud-based application via a wide area network (WAN) and a message broker; receiving, by the protocol endpoint via the message broker, a transmission request from the cloud-based application, the transmission request including a partial message and a destination address for the partial message; and responsive to receiving the transmission request at the protocol endpoint, processing the partial message by performing, with the protocol endpoint, only transport-related operations of the application-layer protocol and transmitting the partial message to the local application based on the destination address.

Example 41 includes the method of example 40, further comprising: responsive to receiving the message at the cloud-based application, processing the message by performing, with the cloud-based application, only non-transport-related operations of the application-layer protocol without performing transport-related operations of the application-layer protocol; responsive to determining, by the cloud-based application, a need to send an application-layer protocol message to the local application, performing non-transport-related operations of the application-layer protocol to generate a partial message; generating, by the cloud-based application, a transmission request containing the partial message and a destination address for the partial message; and transmitting the transmission request to the protocol endpoint via the message broker.

Example 42 includes the methods of examples 40 or 41, wherein the local application that is behind a firewall that protects the private network.

Example 43 includes the methods of examples 40, 41, or 42, wherein performing only transport-related operations of the application-layer protocol includes performing at least one selected from a group consisting of message framing, connection management and reuse, port binding, transmitting and receiving, target resolution, transport layer security and network socket management.

The Abstract of the Disclosure is provided to allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for establishing a local presence on a private network to bidirectionally connect a cloud-based application with a local application on the private network, the cloud-based application and the local application operating in accordance with a same stateful application-layer protocol, the system comprising:
   a protocol endpoint operating on hardware connected to the private network and configured to interface with the local application,
   wherein the local application is behind a firewall of the private network and implements a first part of the stateful application-layer protocol,
   wherein the protocol endpoint is configured to implement a second part of the stateful application-layer protocol, and
   wherein the second part of the stateful application-layer protocol includes only transport-related operations for transporting data between the local application and the cloud-based application, the cloud-based application implementing a third part of the stateful application-layer protocol.

2. The system of claim 1, wherein the transport-related operations include at least one selected from a group consisting of message framing, connection management and reuse, port binding, transmitting and receiving, target resolution, transport layer security and network socket management.

3. The system of claim 1, further comprising:
a cloud computing system communicatively coupled to the private network via a wide-area-network, wherein the cloud-based application is deployed in the cloud computing system, and
the third part of the stateful application-layer protocol includes only non-transport-related operations.

4. The system of claim 3, wherein the cloud computing system further includes:
a message broker cluster configured to dispatch messages between the protocol endpoint and the cloud-based application; and
a real-time streaming server configured to relay real-time traffic between the protocol endpoint and the cloud-based application.

5. The system of claim 3, further comprising:
a software agent installed on hardware connected to the private network, the software agent configured to execute software development operations (DevOps) instructions from a DevOps agent deployed in the cloud computing system.

6. The system of claim 3, wherein the non-transport-related operations includes at least one selected from the group consisting of domain logic and transactional operations.

7. The system of claim 4, wherein the protocol endpoint includes:
a first interface that implements the second part of the stateful application-layer protocol in the private network and is configured to interact with the local application via the private network; and
a second interface that implements a secure messaging protocol via a wide-area-network communicatively coupled to the private network and the cloud computing system, wherein the second interface is configured to communicate with the message broker cluster.

8. The system of claim 7, wherein the protocol endpoint is further configured to perform content marshalling and unmarshalling specific to the stateful application-layer protocol for the second interface.

9. The system of claim 7, wherein the protocol endpoint includes:
a third interface that implements a secure real-time protocol via a wide-area-network communicatively coupled to the private network and the cloud computing system, wherein the third interface is configured to communicate with the real-time streaming server.

10. The system of claim 9, wherein the protocol endpoint is further configured to perform transcoding specific to the stateful application-layer protocol for the third interface.

11. The system of claim 9, wherein the protocol endpoint is further configured to add an identifier for the protocol endpoint to transmissions made via the second interface and the third interface.

12. The system of claim 1, wherein the protocol endpoint is configured to use multiple wide-area-network connections to achieve high availability and increase available bandwidth towards the cloud-based application.

13. The system of claim 1, wherein the cloud-based application includes a client application capable of receiving real-time data.

14. The system of claim 1, wherein the protocol endpoint is further configured to implement high-availability protocols associated with the cloud-based application such that the protocol endpoint can connect concurrently to a plurality of computing nodes that are located at different geographical locations.

15. The system of claim 1, wherein the protocol endpoint is further configured to:
perform self-monitoring operations to gather system health data, and
report the system health data to the cloud-based application.

16. The system of claim 1, wherein the protocol endpoint is part of a virtual protocol-endpoint logical entity and is configured to collaborate with additional protocol endpoints to scale to a total capacity determined by the local application.

17. A method for establishing a local presence on a private network to bidirectionally connect a cloud-based application with a local application on the private network, the method comprising:
receiving, by a protocol endpoint residing on the private network from the local application, a message destined for the cloud-based application, wherein the message conforms to a stateful application-layer protocol implemented by both the local application and the cloud-based application;
responsive to receiving the message, partially processing the message by performing, with the protocol endpoint, only transport-related operations of the stateful application-layer protocol without performing non-transport-related operations of the stateful application-layer protocol;
transmitting, with the protocol endpoint, the message to the cloud-based application via a wide area network (WAN) and a message broker;
receiving, by the protocol endpoint via the message broker, a transmission request from the cloud-based application, the transmission request including a partial message and a destination address for the partial message; and
responsive to receiving the transmission request at the protocol endpoint, processing the partial message by performing, with the protocol endpoint, only transport-related operations of the stateful application-layer protocol and transmitting the partial message to the local application based on the destination address.

18. The method of claim 17, further comprising:
responsive to receiving the message at the cloud-based application, processing the message by performing, with the cloud-based application, only non-transport-related operations of the stateful application-layer protocol without performing transport-related operations of the stateful application-layer protocol;
responsive to determining, by the cloud-based application, a need to send an application-layer protocol message to the local application, performing non-transport-related operations of the stateful application-layer protocol to generate a partial message;
generating, by the cloud-based application, a transmission request containing the partial message and a destination address for the partial message; and
transmitting the transmission request to the protocol endpoint via the message broker.

19. The method of claim 17, wherein the local application that is behind a firewall that protects the private network.

20. The method of claim 19, wherein performing only transport-related operations of the stateful application-layer protocol includes performing at least one selected from a group consisting of message framing, connection management and reuse, port binding, transmitting and receiving, target resolution, transport layer security and network socket management.

* * * * *